Patented Oct. 11, 1938

2,132,395

UNITED STATES PATENT OFFICE 2,132,395

COMPOSITIONS OF MATTER

Herbert S. Coith, Albert S. Richardson, and Verling M. Votaw, Wyoming, Ohio, assignors to The Procter & Gamble Company, Cincinnati, Ohio, a corporation of Ohio No Drawing. Application February 4, 1933,
Serial No. 655,294

32 Claims. (Cl. 99—94)

Our invention relates to prepared flour compositions containing shortening and to the baked or cooked products derived therefrom.

The principal object of our invention is to provide prepared flour compositions which will produce cakes, rolls, muffins, biscuits, waffles and similar food products of improved appearance, volume, and eating qualities. This improvement is particularly evident in the lightness and tenderness of the finished products. In addition, our invention secures a greater tolerance for the various grades and qualities of flour which go into prepared flours to be used in cake making. By the practice of our invention, satisfactory cakes may be made from prepared mixtures containing flours previously considered unsuitable for cake making.

A particular advantage of our invention is to provide prepared cake flours which may be baked into cakes having an unusually high sugar content. These high sugar cakes have very superior eating and keeping qualities.

According to the present invention, prepared flours having these improved qualities are produced by including in their composition a suitable quantity of fat containing combined glycerin in excess of that contained in the natural fats and commercial shortenings, consisting essentially of triglycerides, which have heretofore been incorporated in prepared flour compositions.

The most effective special fat for use in small quantities in the practice of our invention is monoglyceride, containing one mol of combined glycerine to each mol of combined fatty acid. Diglyceride, containing one mol combined glycerin to two mols combined fatty acid, also gives excellent results, but several times as much should be used as in the case of monoglyceride. Thus a complete prepared flour, containing shortening and all the other ingredients except milk or water required in the dough or batter to be baked, is greatly improved by incorporating therein, for instance, synthetic fat consisting essentially of monoglyceride such as that of a hydrogenated vegetable oil of about 60 iodine value in amount equal to .6% of the total weight of prepared flour; and roughly the same improvement is effected by incorporating in the prepared flour about 2% synthetic fat consisting chiefly of the corresponding diglyceride. Such amounts of monoglyceride or diglyceride are best added not as extra ingredients, but in partial replacement of the usual triglyceride shortening in complete prepared flours.

It is not necessary to measure or control the quantity of special fat required in our prepared flours by reference to the absolute quantity of monoglyceride and of diglyceride. Fats and fatty oils containing excess of combined glycerin over that in triglyceride, whether in the form of monoglyceride or diglyceride or both, may collectively be termed "superglycerinated fat". The degree of superglycerination of the special fat used in the practice of our invention may vary from the full excess of combined glycerin present in monoglyceride to the very small excess required to yield a fat consisting chiefly of triglyceride but containing an appreciable percentage of diglyceride. In general, we have found it most satisfactory to control the quantity of superglycerinated fat in our prepared flour by reference to this excess of combined glycerin over that required for triglyceride formation, i. e., the quantity of combined glycerin over and above that required for formation of triglyceride of all the fatty acid present in the superglycerinated fat. For convenience, therefore, any superglycerinated fat may be regarded as made up of the potential triglyceride which it contains and an additional amount of combined glycerin hereinafter referred to either as the excess of combined glycerin over that required for triglyceride formation or simply as excess of combined glycerin.

In their simplest form, the prepared flours of our invention are merely mixtures of flour and superglycerinated fat of relatively high combined glycerin content, i. e., relatively high in monoglyceride and/or diglyceride. In simple prepared flour of this type the proportion of superglycerinated fat is preferably such that the excess of combined glycerin over that required for triglyceride formation is between .1% and .7% of the weight of flour present, corresponding, for instance, to a range of about .6% to 4% monoglyceride of partially hydrogenated cottonseed oil. We can incorporate in a substantially dry, powdered prepared flour an amount of superglycerinated fat sufficient to give excess glycerin higher than .7% of the weight of flour, even up to about 6% (corresponding to slightly more than one third as much monoglyceride as flour), but we have not found such practice economical unless the flour so prepared is intended for mixing with ordinary flour for the preparation of doughs and batters. Our preferred range of .1% to .7% excess combined glycerin based on the total flour applies to simple mixtures of flour and superglycerinated fat intended for incorporation in doughs and batters including usually additional shortening (of the ordinary triglyceride type such as lard) but not including any additional flour.

For instance, a prepared flour containing an amount of excess combined glycerin equal to about .2% of the weight of flour can be made by mixing 100 parts of a given flour either with 2.2 parts of superglycerinated hydrogenated cottonseed oil of about 60 iodine value containing 18.8% combined glycerin, or with 3.2 parts of the corresponding superglycerinated fat prepared so as to contain 16.3% combined glycerin. These two prepared flours would be about equally improved over the original flour with respect to texture of cakes and other baked goods made therewith, the chief practical difference being in the allowance which should be made in the dough or batter for the different quantities of shortening already incorporated in the flours. Examples 1 and 2, hereinafter given, further illustrate the application of our invention to partially shortened prepared flours of the simple type described above.

In commercial practice, prepared flours ordinarily contain all, not merely a part, of the shortening required in the dough or batter to be cooked. A complete prepared flour contains also the various other ingredients of the mix which can be incorporated with the flour without destroying its substantially dry, powdered form, such as leavening agent, salt, sugar, dried egg, dried milk, and flavors. In compounding fully shortened prepared flours according to the present invention, the proportion of superglycerinated fat to be added is more conveniently considered from the standpoint of the total shortening than from the standpoint of the total mix. Depending upon the excess of combined glycerin which it contains, superglycerinated fat in our prepared flour replaces varying proportions of the usual shortening— from 100% down to 2% or even less, usually between 4% and 14%.

For instance, .04 pound of a typical monoglyceride incorporated along with each pound of total shortening produces a result roughly equivalent to .14 pound of the corresponding diglyceride per pound of total shortening, and about the same result may be obtained if, instead of using a concentrated form of superglycerinated fat, the shortening as a whole is prepared in such a way as to contain about 0.7% more combined glycerin than would be required to form the triglyceride of all the fatty acid contained in the shortening.

In the practice of our invention in its preferred form, the quantity of superglycerinated fat used is such that the excess of combined glycerin (over that required for triglyceride formation) is between 0.3% and 1.5% of the weight of total shortening incorporated in a completely shortened prepared flour. However, we do not limit ourselves to this exact range, since appreciable improvement in the quality of the prepared flour can be obtained below this preferred range, and excellent results are obtained above this range. In the extreme case, we have replaced all of the ordinary shortening in cake made from our prepared flour with a fat consisting essentially of monoglyceride and hence having about 15% more combined glycerin than would normally be present in triglyceride shortening from the same source of fat.

Preparation of the superglycerinated fat does not constitute a part of the present invention. It may be prepared, according to known methods, by combining glycerin directly with triglycerides or by combining fatty acid with a suitable proportion of glycerin. For instance, if a triglyceride shortening such as partially hydrogenated cottonseed oil of about 60 iodine value is agitated at about 240° C. with about 10% its weight of glycerin, reaction between the triglyceride and glycerin occurs. If the reaction is interrupted after about one hour, the upper layer is a superglycerinated fat (estimated to contain roughly 10% diglyceride) suitable for use in our invention, if it replaces all or the major part of the usual shortening in the prepared flour. If reaction continues for a longer time under the conditions stated, the proportion of combined glycerin increases and the synthetic fat eventually consists chiefly of diglyceride and may be used to supplement the usual shortening or to replace a minor fraction of it. Also special methods of forming monoglycerides and diglycerides by direct reaction of glycerin and triglyceride are known in the prior art, and procedures for preparing superglycerinated fat by esterifying fatty acids with glycerin are well-known and readily found in the literature.

In general, we have found unsaturated superglycerinated fat superior to saturated superglycerinated fat with respect to the texture of baked products such as are made from prepared flours. However, with respect to resistance to rancidity in the prepared flour, saturated fats are known to be better, and glycerides of unsaturated fatty acids of molecular formula containing two or more double bonds, e. g., cottonseed oil or other typical unsaturated vegetable oil, are likely to be very unsatisfactory. Consequently we prefer to use in our prepared flours superglycerinated fat derived predominantly from oleic acid and other acids containing only one double bond in the molecular formula. Such a fat source is readily available in the form of partially hydrogenated fatty oils such as cottonseed, sesame, peanut, corn, soybean, whale, and pilchard oils and the like, especially hydrogenated oils in the range 60 to 70 iodine value, or slightly lower. Lard and tallow, preferably after a slight hydrogenation, may also be used as the source of our superglycerinated fat. Superglycerinated fat from unhydrogenated oils may also be used, but at the sacrifice of keeping quality, which is of course not of extreme importance in the case of a prepared flour converted to cake or other cooked product and consumed soon after manufacture. The fat is preferably deodorized while still in the form of triglyceride.

The ordinary shortenings heretofore used in prepared flours are of plastic consistency, being mixtures of solid and liquid triglycerides. Monoglycerides and diglycerides prepared from the preferred fat sources set forth above are also of plastic consistency and, when mixed with plastic triglyceride shortening, are in general without significant stiffening effect thereon. In fact, we prefer that the monoglycerides and diglycerides incorporated in our prepared flours should have a softening rather than a stiffening effect on any ordinary plastic shortening of the triglyceride type which may also be incorporated in the same prepared flour.

Oils of the coconut type are preferably not used in substantial proportion in the preparation of our superglycerinated fat. The monoglyceride of coconut fatty acids is inferior in flavor to most superglycerinated fats. In general, synthetic fats derived from fatty acids of average molecular weight corresponding to not less than 16 carbon atoms are preferred.

Because of superior resistance to rancidity or for some other special reason, it may sometimes be desirable to prepare the superglycerinated fat required for the practice of our invention chiefly from the higher saturated fatty acids like palmitic and stearic. For instance, a suitable source of such fatty acids would be any of the above named oils, other than coconut oil, after almost complete hydrogenation. If our superglycerinated fat is thus derived chiefly from the higher saturated fatty acids, it contains preferably enough monoglyceride to bring the combined glycerin content to about 19% or more. While we may readily compensate for the lower efficiency of diolein as compared with monolein by using more of the former, we have not found any larger quantity of fat of the distearin type to be a practical equivalent of fat of the monostearin type in baked goods such as are made from our prepared flours.

We find that to obtain the best quality in cake or other baked goods made from our prepared flours it may be necessary to adjust the quantity of free fatty acid incorporated in the prepared flour. Whether such free fatty acid is added separately or is merely a part of the shortening used, the total amount of free fatty acid is preferably between .13% and 4% of the shortening used. We have found that the same improved result may be obtained by the use of a quantity of soap about the same as the quantity of free fatty acid mentioned above. Combinations of free fatty acid and soap are also effective. Any added free fatty acid or soap, of course, should be carefully prepared from fat of edible grade, for instance from any of the fats already mentioned as affording satisfactory fat sources for the preparation of our superglycerinated fat.

Our invention is particularly useful in the case of prepared cake flours containing a chemical leavening agent. For instance, if a typical prepared cake flour as heretofore made is improved by incorporating therewith superglycerinated fat in accordance with the present invention, the increase in volume of the resulting cake averages between 10% and 20% with a corresponding increase in lightness. In obtaining this advantage, the superglycerinated fat appears to act as a supplement to the leavening material. This leavening agent raises the cake while in the oven to a considerably larger volume than is possessed by the finished and cooled cake. This extra volume is usually lost during the last few minutes in the oven as the cake is setting. The superglycerinated fat apparently strengthens the cell structure of the cake, for we find that a large part of the volume usually lost in this setting period is retained in the finished cake made from a prepared flour such as we have described.

We have found that this stability of the structure particularly of cakes, which is obtained by the practice of our invention is especially advantageous in making cakes having a sugar content materially higher than is now the common practice. Under present practice, leavened prepared cake flours, and the ordinary leavened cakes such as are made from prepared cake flours, contain sugar in amount not greater than the amount of flour. If more sugar than flour is incorporated in a leavened cake made in the ordinary way with the shortening and flour heretofore available and commonly used in commercial cakes, the resulting cake is likely to have a poor texture and to be deficient in volume, if not a complete failure. On the other hand, we have found that as much as 125%-165% sugar on the basis of flour may be incorporated in our prepared cake flours with good results in the finished cake. The proportions of milk or water which may be successfully incorporated in the cake are also increased by aid of this invention. This increase in sugar and moisture results in cakes with greatly improved texture, flavor, keeping qualities, and sweetness. The cost of the finished cake is at the same time reduced on account of the relatively greater proportion of sugar and moisture.

The superglycerinated fat is readily incorporated in the dry prepared mixture in the same way as the ordinary triglyceride shortening, whether premixed therewith or added as a separate ingredient. These methods are well-known and usually consist in either creaming the fat with the dry constituents and then sieving the final mixture or spraying the melted fat on the dry constituents as they are being mixed and sieving the final mixture.

*Example 1.—Partially shortened flour*

| | Per cent |
|---|---|
| Flour | 98.4 |
| Monoglyceride of hydrogenated cottonseed oil of 65 iodine value | 1.6 |

*Example 2.—Partially shortened flour*

| | |
|---|---|
| Flour | 92.0 |
| Diglyceride of hydrogenated cottonseed oil of 65 iodine value | 8.0 |

*Example 3.—Fully shortened flour*

| | Per cent |
|---|---|
| Flour | 71.5 |
| Hydrogenated sesame oil of 70 iodine value | 26.0 |
| Mixed monoglyceride and diglyceride of hydrogenated peanut oil of 68 iodine value, containing 20% combined glycerin | 2.5 |

*Example 4.—Self rising shortened flour*

| | |
|---|---|
| Flour | 68.4 |
| Baking powder | 3.2 |
| Hydrogenated cottonseed oil of 65 iodine value | 17.0 |
| Hydrogenated sesame oil of 70 iodine value | 7.3 |
| Diglyceride of hydrogenated sesame oil of 70 iodine value | 4.1 |

*Example 5.—Prepared biscuit flour*

| | |
|---|---|
| Flour | 72.0 |
| Baking powder | 4.0 |
| Salt | 1.1 |
| Skim milk powder | 4.8 |
| Mixture of equal parts of cottonseed oil and sesame oil hydrogenated to 70 iodine value | 12.0 |
| Diglyceride of hydrogenated peanut oil of 60 iodine value | 1.8 |
| Granulated sugar | 4.3 |

*Example 6.—Prepared cake flour—Yellow layer*

| | Per cent |
|---|---|
| Flour | 39.7 |
| Sugar | 37.8 |
| Salt | .7 |
| Baking powder | 1.1 |
| Hydrogenated cottonseed oil of 65 iodine value | 13.4 |
| Synthetic glycerides of hydrogenated cottonseed oil of 65 iodine value, containing 23% combined glycerin | .6 |
| Skim milk powder | 2.1 |
| Dried whole eggs | 4.6 |

Example 7.—Prepared cake flour—Yellow layer

| | Per cent |
|---|---|
| Flour | 29.0 |
| Sugar | 42.8 |
| Salt | 1.4 |
| Baking powder | 1.4 |
| Hydrogenated cottonseed oil of 65 iodine value | 15.3 |
| Superglycerinated hydrogenated cottonseed oil of 65 iodine value, containing 18% combined glycerin | 1.8 |
| Skim milk powder | 2.9 |
| Dried whole eggs | 5.4 |

Example 8.—Prepared cake flour—Yellow layer

The superglycerinated hydrogenated fat in Example 7 is replaced by superglycerinated fat prepared from unhydrogenated cottonseed oil and containing approximately 18% combined glycerin, all other ingredients in the formula remaining the same as in Example 7.

In the above examples, the superglycerinated fats designated as monoglyceride do not necessarily consist of monoglyceride exclusively, but are synthetic fats consisting predominantly of monoglyceride. Likewise the fats designated as diglyceride should be understood to be synthetic fats consisting chiefly of diglyceride and containing combined glycerin in the neighborhood of 15%.

The above examples are intended primarily to be illustrative. Special prepared flours for white layer cake, devil's food cake, pancakes and various other edible products made from flour as base may also be prepared in accordance with this invention; in the preparation of such prepared flours, the essential deviation from usual practice is the incorporation of superglycerinated fat in the prepared flour in the manner set forth above and illustrated in the foregoing examples.

The present application contains subject matter in common with our copending applications Serial Nos. 655,292, 655,293, and 655,295, filed concurrently herewith, none of which claims specifically prepared flour compositions such as are described and claimed herein.

Having thus described the invention, what is claimed as new and desired to be secured by Letters Patent is:

1. A prepared flour composition in substantially dry form including shortening, said shortening consisting essentially of glycerides and containing synthetic glycerides of the group consisting of predominantly unsaturated monoglycerides and diglycerides of higher fatty acids and monoglycerides of predominantly saturated higher fatty acids.

2. A prepared flour composition in substantially dry form, containing synthetic glycerides of the group consisting of monoglycerides and diglycerides of predominantly unsaturated higher fatty acids.

3. A prepared flour composition in substantially dry form, containing synthetic glycerides of the group consisting of higher fatty acid monoglycerides and diglycerides derived predominantly from oleic acid.

4. A prepared flour composition in substantially dry form including shortening, said shortening consisting essentially of glycerides and containing monoglyceride of fatty acids predominantly of molecular formula containing at least 16 carbon atoms and not more than one double bond.

5. A prepared flour composition in substantially dry form, containing diglyceride of higher fatty acids predominantly of the same degree of unsaturation as oleic acid.

6. A substantially dry powdered mixture containing flour and shortening, said shortening consisting essentially of fatty acid glycerides containing combined glycerin in excess of that required for triglyceride formation, said excess of combined glycerin being not less than .1% of the weight of flour in the mixture and being present predominantly in the form of synthetic fat selected from the group consisting of monoglycerides of higher fatty acids and diglycerides of higher unsaturated fatty acids.

7. A substantially dry powdered mixture containing flour and shortening, said shortening consisting essentially of higher fatty acid glycerides containing an excess of combined glycerin over that required for triglyceride formation, said excess of combined glycerin being between .1% and .7% of the weight of flour in the mixture and being present predominantly in the form of synthetic fat selected from the group consisting of monoglycerides of higher fatty acids and diglycerides of higher unsaturated fatty acids.

8. A composition of matter in pulverulent form, comprising flour and shortening, said shortening consisting essentially of fatty acid glycerides and including glycerides of the class consisting of monoglycerides and diglycerides of predominantly unsaturated fatty acids derived from partially hydrogenated fats.

9. A composition of matter in pulverulent form, comprising flour and shortening, said shortening consisting essentially of fatty acid glycerides and including glycerides of the class consisting of monoglycerides and diglycerides of the mixed fatty acids of hydrogenated vegetable oils of about 60 to 70 iodine value.

10. A substantially dry powder comprising flour and shortening, said shortening consisting essentially of a plastic mixture of glycerides of higher fatty acids in proportions suitable for incorporation in baked products, said glycerides being characterized by synthetically introduced combined glycerin in excess of that required for triglyceride formation, said excess combined glycerin being present in the form of synthetic fat selected from the group consisting of monoglycerides and diglycerides of predominantly unsaturated higher fatty acids and monoglycerides of predominantly saturated higher fatty acids.

11. A composition of matter of the type claimed in claim 6, in which the excess of combined glycerin over that required for triglyceride formation is not less than .3% of the total weight of shortening in the mixture.

12. A composition of matter of the type claimed in claim 6, in which the excess of combined glycerin over that required for triglyceride formation is between .3% and 1.5% of the total weight of shortening in the mixture.

13. A composition of matter in substantially dry powdered form and suitable for incorporation in bakery products, comprising flour, leavening agent, and fat characterized by synthetically introduced combined glycerin in excess of that required for triglyceride formation, said fat consisting essentially of glycerides, and said excess of combined glycerin being present predominantly in the form of synthetic fat selected from the group consisting of monoglycerides of higher fatty acids and diglycerides of higher unsaturated fatty acids.

14. A composition of matter of the type claimed in claim 13, in which the excess of combined glycerin over that required for triglyceride formation is between .3% and 1.5% of the total weight of fat in the mixture.

15. A substantially dry composition of matter suitable for use in cooked edible products, comprising flour, shortening containing superglycerinated fat, and added free fatty acid.

16. A substantially dry composition of matter suitable for use in cooked edible products, comprising flour, shortening containing superglycerinated fat, and a small quantity of soap.

17. A substantially dry prepared flour of the type containing shortening, characterized by replacement of part of the usual triglycerides of the shortening with glycerides of the group consisting of monoglycerides and diglycerides of higher fatty acids, and further characterized by having between .13% and 4% of the total fatty material of the mixture present in the form of compounds of the group consisting of free fatty acids of edible grade and the soaps derivable therefrom.

18. A substantially dry prepared flour of the type containing sugar and shortening including fatty esters in which all such esters are glycerine esters, characterized by replacement of part of the usual triglycerides of the shortening by glycerides slected from the group consisting of monoglycerides and diglycerides of predominantly unsaturated higher fatty acids and monoglycerides of predominantly saturated higher fatty acids.

19. A substantially dry prepared flour containing shortening and an amount of sugar exceeding the amount of flour, characterized by replacement of part of the usual triglyceride shortening with synthetic glycerides of higher fatty acids containing more combined glycerin than that required for triglyceride formation.

20. A substantially dry prepared flour comprising shortening, dried egg, dried milk, and a quantity of sugar exceeding the quantity of flour, said shortening consisting essentially of glycerides of higher fatty acids and being characterized by a combined glycerin content in excess of that required for triglyceride formation.

21. A prepared cake flour containing sugar, dried egg, dried milk, leavening agent, and shortening consisting essentially of a plastic mixture of glycerides of higher fatty acids characterized by synthetically introduced combined glycerin in excess of that required for triglyceride formation, said excess of combined glycerin being not less than .3% of the weight of total shortening incorporated in the prepared flour and being present predominantly in the form of synthetic fat selected from the group consisting of monoglycerides of higher fatty acids and diglycerides of higher unsaturated fatty acids.

22. In the process of manufacturing prepared flour, the step which consists in incorporating therein fat consisting essentially of glycerides of the group consisting of monoglycerides and diglycerides of predominantly unsaturated higher fatty acids and monoglycerides of predominantly saturated higher fatty acids.

23. A prepared flour composition in substantially dry form including flour and fatty acid esters in which all such esters are glycerides, said glycerides consisting of triglycerides and synthetic glycerides predominantly of the monoglyceride type and of the type derived principally from fatty acid containing not less than 16 carbon atoms in the molecular formula.

24. A prepared flour composition in substantially dry form including flour and higher fatty acid glycerides, said glycerides consisting of triglycerides and synthetic glycerides predominantly of the monoglyceride type and of the type derived principally from fatty acid containing one double bond in the molecular formula.

25. A prepared flour composition in substantially dry form, including flour and fatty acid glycerides, said glycerides consisting of triglycerides and synthetic glycerides predominantly of the monoglyceride type and of the type derived principally from fatty acid containing one double bond and not less than 16 carbon atoms in the molecular formula.

26. A prepared flour composition in substantially dry form including flour and synthetic fat, all such synthetic fat consisting essentially of glycerides of predominantly saturated fatty acids averaging not less than 16 carbon atoms in the molecular formula, said synthetic fat containing not less than 19% combined glycerin.

27. A substantially dry prepared cake flour containing shortening and an amount of sugar exceeding the amount of flour by not less than 25%, said shortening comprising glycerides of the group consisting of monoglycerides and diglycerides of higher fatty acids.

28. A dry shortened prepared cake flour characterized by a proportion of sugar exceeding that of flour, the higher fatty acids of the shortening being predominantly of the same degree of unsaturation as oleic acid and being esterified with more glycerin than required to form triglycerides, said excess of combined glycerin in the esterified product being present mainly in the form of synthetic fat selected from the group consisting of monoglyceride and diglyceride.

29. The composition of matter claimed in claim 8 in which the partially hydrogenated fat is hydrogenated cotton-seed oil.

30. The composition of matter claimed in claim 8 in which the partially hydrogenated fat is hydrogenated sesame oil.

31. A composition of matter suitable for use in baked goods, consisting of an intimate mixture of flour and shortening selected from the group of compounds consisting of mono-, di-, and triglycerides of fatty acids predominantly of molecular formula having at least 16 carbon atoms, the proportion of said glycerides being such that the combined glycerin is not less than about 19% of the total weight of glycerides.

32. A prepared flour consisting of the composition of matter claimed in claim 31 and a small amount of free fatty acid.

HERBERT S. COITH.
ALBERT S. RICHARDSON.
VERLING M. VOTAW.